(12) United States Patent
Schmitt

(10) Patent No.: US 6,594,558 B1
(45) Date of Patent: Jul. 15, 2003

(54) METHOD FOR VERIFYING TIRES OF VEHICLES IN THE DRIVING STATE

(75) Inventor: Johannes Schmitt, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,559

(22) PCT Filed: Aug. 11, 2000

(86) PCT No.: PCT/DE00/02696

§ 371 (c)(1),
(2), (4) Date: Jan. 22, 2002

(87) PCT Pub. No.: WO01/49514

PCT Pub. Date: Jul. 12, 2001

(30) Foreign Application Priority Data

Dec. 30, 1999 (DE) .......................... 199 63 751

(51) Int. Cl.$^7$ .......................... G06F 7/00; B60C 23/00; B60C 23/02
(52) U.S. Cl. .......................... 701/1; 701/29; 340/425.5; 340/442; 73/146.2
(58) Field of Search .......................... 701/1, 29, 34, 701/35, 37; 73/146.2; 340/442, 425.5

(56) References Cited

U.S. PATENT DOCUMENTS 3,526,873 A * 9/1970 Burt .......................... 340/58
4,355,297 A   10/1982 Sinha et al. .......................... 340/58

FOREIGN PATENT DOCUMENTS

DE    39 37 966      5/1991
DE    196 20 581    11/1997

OTHER PUBLICATIONS

Jorg Stocker, "Intelligente Reifen,"—Swischenergebnisse einer interdisziplinaren Forschungskooperation in ATZ Automotiltechnische Zeitschrift 97, 1995, 12, pp. 824–832.

* cited by examiner

Primary Examiner—Yone Beaulieu
(74) Attorney, Agent, or Firm—Kenyon & Kenyon

(57) ABSTRACT

In a method for checking tires of vehicles during driving, signals which provide information about an adhesion between the tire and the roadway in the vertical direction with respect to the roadway are detected by sensors provided at the tire. The signals are evaluated in an evaluation unit with respect to their amplitude, such that the amplitude characteristic for the detected signals can indicate a disturbance occurring at the tire. An occurrence of a disturbance is indicated on a display unit and is stored for diagnostic purposes.

11 Claims, 4 Drawing Sheets

METHOD FOR VERIFYING TIRES OF VEHICLES IN THE DRIVING STATE

FIELD OF THE INVENTION

The present invention relates to a method for checking vehicle tires during driving.

BACKGROUND INFORMATION

It is of utmost importance for driving safety that the tires of a motor vehicle be in good condition. Generally the tires are examined by appearance for their further future operational fitness during their seasonal change from summer to winter tires, and then are possibly exchanged for new tires. However, the tires are not always balanced when being changed. The result is that an imbalance appearing at the tire can impair driving safety. It can also occur that the operational fitness of a tire on a vehicle is impaired because of a braking which is too strong or from standing too long in one position; this impairment can possibly be rectified by balancing the tires.

From Stöcker, Jörg, i.a.: Der "Intelligente Reifen"—Zwischenergebnisse einer interdisziplinären Forschungskooperation [The "Intelligent Tire"—Intermediate Results of an Inter-disciplinary Research Cooperation] in ATZ Automobiltechnische Zeitschrift 97, 1995, 12, P. 824–832, it is known to equip a tire with an integrated force sensor by which it is possible to detect forces acting upon the tire in three directions, namely, the longitudinal or X direction, the transverse or Y direction and the vertical or Z direction. The signals derived from these detected forces can be supplied to an evaluation unit in which a desired evaluation of the signals is carried out.

The German Published Patent Application No. 196 20 581 describes a further device for ascertaining the rotational behavior of a vehicle wheel.

SUMMARY OF THE INVENTION

An object of the present invention is to provide a method for checking vehicle tires during driving, by which a disturbance occurring at the tire can be detected.

The design approach of the present invention utilizes a signal detected by a tire sensor for determining a disturbance occurring at the tire, the amplitude characteristic of the signal being analyzed during one wheel revolution. The amplitude characteristic for the detected signal is advantageously analyzed repeatedly for a number of periods, one period corresponding to one wheel revolution. Furthermore, the analyzed amplitude characteristic can be compared to the amplitude characteristic of a signal produced by a sensor at another tire in order to give plausibility to the test results. The appearance of a disturbance at the tire, e.g. a tire imbalance, can be indicated by a display unit. The display unit can also then indicate advice and recommendations for the driver. In addition, upon detection of a disturbance at the tire, a signal can be supplied to the engine management in order to influence it.

The method of the present invention makes it possible in particular to detect a disturbance or a defect at a tire of a vehicle, for example, a tire imbalance, while driving. A vehicle driver can thereby reliably determine himself whether tires on his vehicle must be changed or balanced, since it can be indicated to him by a display unit.

DETAILED DESCRIPTION

Figure 1:
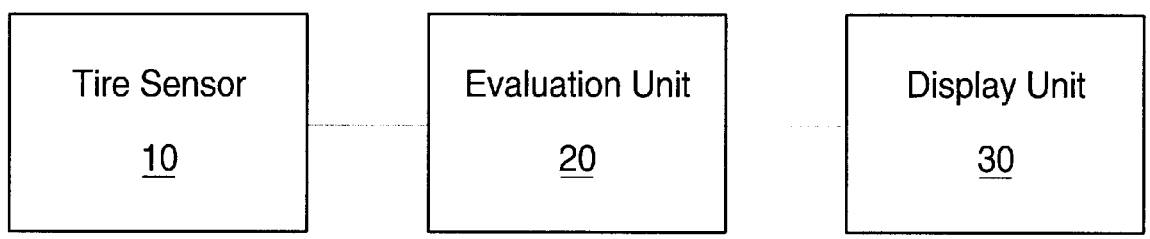
FIG. 1 shows a block diagram of a system for carrying out the method of the present invention for checking the behavior of vehicles during travel operation.

According to FIG. 1, using a sensor 10 provided at the tire, signals are detected during driving which provide information about the adhesion between the roadway and the tire. Signals can be detected in the X direction in the direction of travel or contrary to the direction of travel of the tire, in the Y direction transverse to the direction of travel of the tire, or in the Z direction vertical to the direction of travel. The signals in the Z direction of interest here describe the radial adhesion between the roadway and the tire. Examples for signals in the Z direction can be gathered, for example, from pictures 13 and 14 in the article by Stöcker, Jörg, i.a. indicated above: Der "Intelligente Reifen"—Zwischenergebnisse einer interdisziplinären Forschungskooperation in ATZ Automobiltechnische Zeitschrift 97, 1995, 12, P. 824–832.

The signals in the Z direction have a uniform characteristic with the period of the rotational speed of a tire. The amplitudes of the signals vary, for example, as a function of the tire internal pressure, which can thus be measured by the system described in the article by Stöcker, Jörg, i.a.: Der "Intelligente Reifen"—Zwischenergebnisse einer interdisziplinären Forschungskooperation in ATZ Automobiltechnische Zeitschrift 97, 1995, 12, P. 824–832.

Prerequisite for such a measurement is that the tire is running true during driving and is not influenced by any disturbances. If the measurement is carried out at a tire which, because the vehicle has bee left standing too long or because of too strong a braking, has a flat spot, i.e. a "flat foot", or which is no longer properly balanced, then the signals measured during driving no longer exhibit the periodically recurrent, normal amplitude characteristic. Instead, because of an out-of-round location on the tire, a disturbance appears in the amplitude characteristic which, for example, can be recognized in the form of a peak or peak value, or by a deviation from the even amplitude characteristic.

Figure 2:
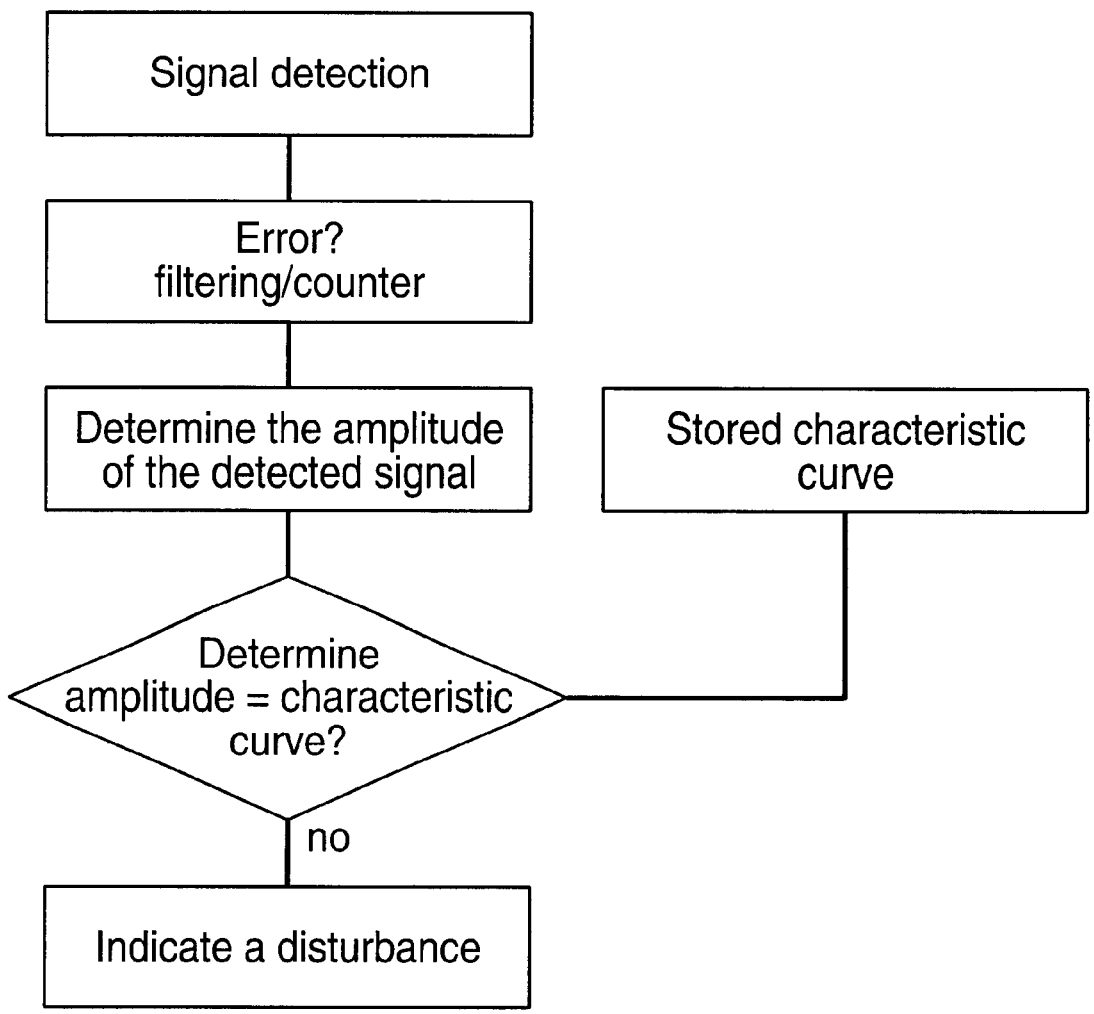
FIG. 2 shows a schematic flow chart of one possibility for determining a disturbance at the tire of a vehicle.
Figure 3:
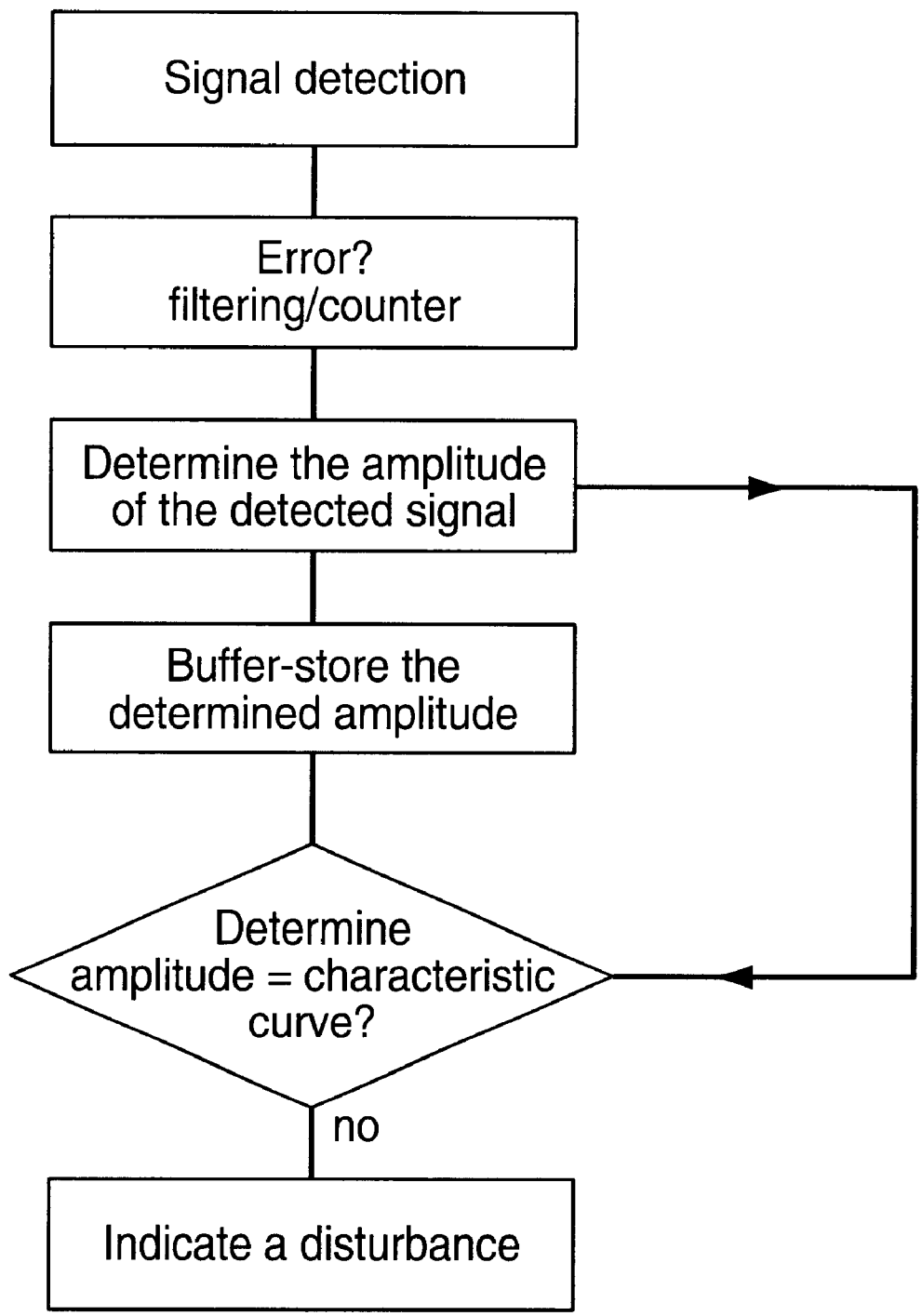
FIG. 3 shows a schematic flow chart of a further possibility for determining a disturbance at the tire of a vehicle.
Figure 4:
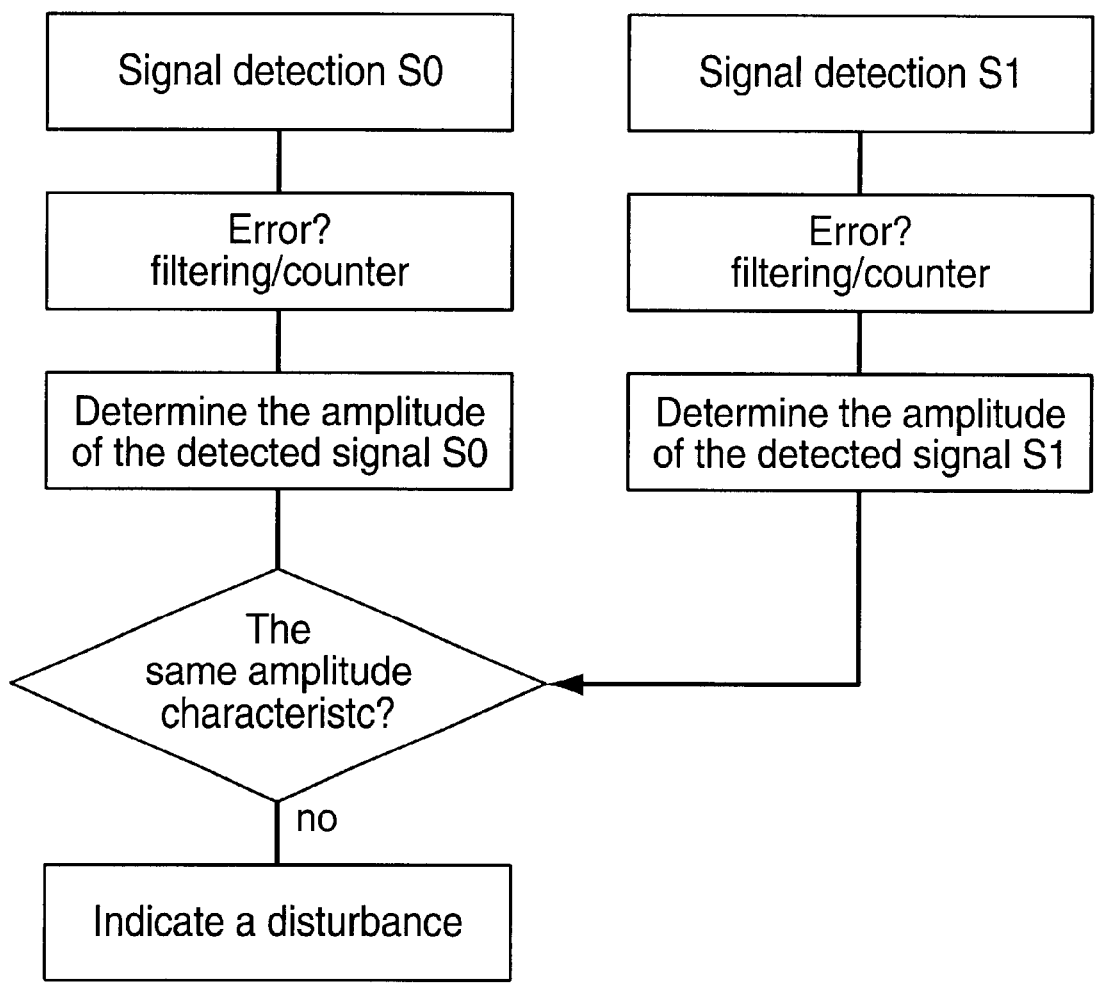
FIG. 4 shows a schematic flow chart of another possibility for determining a disturbance at the tire of a vehicle.

To determine whether the amplitude characteristic of the signal detected during driving by a tire sensor 10 has a disturbance or not, the detected signal is supplied to an evaluation unit 20 shown in FIG. 1. In evaluation unit 20, it is then checked whether the signal was detected in an error-free manner. In addition, the detected signals are subjected to a filtering. An adjustment, described in detail later, and a query of a counter to be implemented in the further course of the method are also carried out. These individual steps are preferably run through prior to a further processing of the detected signals, as is indicated in FIGS. 2 through 4. After determining the amplitude of the detected signals, evaluation unit 20 can then establish in various ways whether a disturbance exists at the tire.

The evaluation unit can carry out a comparison with characteristic curves, stored previously in a memory, with tolerance band for the normal operation. This requires a previous knowledge about parameters of the tire, such as the tire internal pressure, for which different characteristic curves are valid. This possibility for determining a disturbance at the tire of a vehicle is shown schematically in FIG. 2.

A further possibility for determining a disturbance at the tire of a vehicle in evaluation unit 20 is to analyze the amplitude characteristic of a detected signal for sudden changes. This can be done, for example, by continuously comparing an acquired amplitude value to an amplitude value acquired directly before that. If, in so doing, the difference between the compared amplitude values is greater than a predetermined value, then a sudden (amplitude) change is determined. This possibility for determining a disturbance at the tire of a vehicle is shown schematically in FIG. 3.

Furthermore, evaluation unit 20 can be designed in such a way that signals S0 and SI detected at two or more tires of a vehicle are supplied to it simultaneously. These signals S0 and S1 are then compared to one another. If the comparison shows that the amplitude characteristics of detected signals S0 and S1 are equal to one another, no tire disturbance exists. Otherwise, a tire disturbance can be assumed. When working with this possibility for detecting a disturbance at the tire of a vehicle, it is presupposed that the tire at which comparison signal S1 is detected has no disturbance. This possibility for determining a disturbance at the tire of a vehicle is shown schematically in FIG. 4.

The last indicated comparison of the amplitude characteristic of a signal detected at one tire to an amplitude characteristic of a signal detected at another tire can also be carried out in addition to the two possibilities for analyzing the amplitude characteristics of detected signals first indicated, in order to give plausibility to the respective test results. The other tire can be arranged in the axle direction, in transverse direction or in diagonal direction with respect to the tire just checked.

To ensure that a sudden change in amplitude, i.e. an amplitude deviation or difference of a detected signal actually results from a tire disturbance and not from a disturbance on the roadway such as holes or stones on the roadway, provision is made to carry out the analysis over several periods. This can be implemented by setting a counter to a maximum number of periods corresponding to the number of revolutions of a tire, for which number the analysis is to continue. An increment takes place after each analysis, until the set maximum number of periods is reached. Only after the counter has expired is it decided—if the sudden change in amplitude, that is to say the amplitude deviation or difference of a detected signal has occurred in each of the counted periods—that a disturbance exists at the tire.

The existence of the disturbance at the tire can be brought to the attention of a driver via a display unit 30 shown in FIG. 1. The display can be such that a behavior of the vehicle, for example, banging or vibrations, is explained to the driver. Furthermore, a specific speed can be recommended which is suitable for eliminating the unpleasant travel feeling for the driver. The engine management can also limit the speed. In addition, a diagnostic entry for the service station can be written into a memory.

The vehicle condition is indicated to the driver by the detection of a tire imbalance according to the present invention. This is particularly important in the case of rental vehicles and company vehicles whose drivers change frequently. The detection of a tire imbalance increases driving safety.

What is claimed is:

1. A method for checking a behavior of a vehicle during driving, comprising:

causing sensors provided at a tire to detect signals providing information about an adhesion between the tire and a roadway in a vertical direction with respect to the roadway;

comparing, in an evaluation unit, amplitude characteristics of the detected signals to a selected one of a plurality of different characteristic curves of the tire; and determining a disturbance occurring at the tire based on the comparison.

2. The method according to claim 1, further comprising:

comparing in the evaluation unit the amplitude characteristics of the detected signals to a previously stored amplitude characteristic curve for a normal state of the tire in order to determine an amplitude deviation.

3. The method according to claim 1, further comprising:

comparing in the evaluation unit an amplitude of one of the detected signals to an amplitude of another signal detected directly before the one of the detected signals, in order to determine a sudden change in amplitude.

4. The method according to claim 1, further comprising:

comparing in the evaluation unit an amplitude of one of the detected signals to an amplitude of another signal detected by another sensor at another tire, in order to determine an amplitude difference between the one of the detected signals and the detected other signal.

5. The method according to claim 1, further comprising:

in the evaluation unit, comparing the amplitude characteristics of the detected signals to amplitude characteristic of other signals detected at at least one other tire.

6. The method according to claim 1, further comprising:

evaluating the amplitude characteristics of the detected signals, and performing the comparing for a predetermined number of periods corresponding to a number of revolutions of the tire.

7. The method according to claim 6, wherein:

the predetermined number of periods is set in a counter.

8. The method according to claim 1, further comprising a performance of at least one of the steps of:

causing a display unit to indicate the disturbance to a driver; and supplying a signal indicative of the disturbance to an engine management to possibly influence the engine management.

9. The method according to claim 8, wherein:

the display unit indicates a recommendation for a further driving to the driver.

10. The method according to claim 1, further comprising the step of:

upon determining the disturbance at the tire, storing a diagnostic entry for a service station in a memory.

11. The method according to claim 1, wherein each of the plurality of different characteristic curves corresponds to a different tire internal pressure.

* * * * *